United States Patent [19]
Stevenson

[11] 3,839,761
[45] Oct. 8, 1974

[54] RAMP ASSEMBLY FOR LOADING DOCK

[76] Inventor: Norman R. Stevenson, 10520 Harry Hines, Dallas, Tex.

[22] Filed: Aug. 31, 1972

[21] Appl. No.: 285,471

[52] U.S. Cl. .................................................. 14/71
[51] Int. Cl. ............................................ B65g 11/00
[58] Field of Search ................................. 14/71, 72

[56] References Cited
UNITED STATES PATENTS

| | | | |
|---|---|---|---|
| 2,871,505 | 2/1959 | Clark .................................... | 16/180 |
| 3,288,522 | 11/1966 | Norton ................................. | 14/71 X |
| 3,570,033 | 3/1971 | Hovestad ............................. | 14/71 |
| 3,583,014 | 6/1971 | Brown .................................. | 14/71 |
| 3,685,077 | 8/1972 | Wiener et al. ...................... | 14/71 |

*Primary Examiner*—Nile C. Byers, Jr.
*Attorney, Agent, or Firm*—H. Mathews Garland

[57] ABSTRACT

A ramp assembly for connection with a loading dock to bridge the usual gap between the bed of a truck and the loading dock while the truck is being loaded or unloaded at the dock. The ramp assembly includes a pair of hinged load bearing ramp plates to be secured to a metal bar or plate forming a part of the front of the loading dock and adapted to be selectively positioned to provide a load bearing surface between a truck bed and the dock surface. The plates are hinged together and one of the plates is provided with a longitudinal edge hinge secured to an angle member which is welded to the steel plate in the dock. A pair of bump blocks are secured to the dock face at opposite ends of the loading plates. Stop means are secured on the inside faces of the bump blocks to position a first of the ramp plates at a near horizontal position and a spring assembly is connected between the plates and the angle and one of the bump blocks for biasing the plates upwardly to reduce the force required to lift them when positioning them on a loading truck bed.

9 Claims, 10 Drawing Figures

PATENTED OCT 8 1974 3,839,761
SHEET 1 OF 2

RAMP ASSEMBLY FOR LOADING DOCK

This invention relates to devices for loading and unloading trucks and more particularly relates to a dock assembly for use with a loading dock to facilitate movement of cargo bearing vehicles between a truck bed and a loading dock during the loading and unloading of the truck.

In loading and unloading, a truck is generally backed to a loading dock to permit the movement of cargo between the bed of the truck and the loading dock. Often, the character of the truck and the loading dock, along with the driving surface over which the truck must move and rest at loading and unloading position, makes it difficult to position the back edge of the truck bed sufficiently close to the dock edge and at the proper elevation to permit smooth, easy movement of cargo between the dock and truck bed. The truck bed edge may end up positioned slightly higher or lower then the loading dock, at an angle which somewhat hinders efficient movement between the bed and the loading dock, or otherwise out of alignment with the dock edge sufficiently that load transfer may not be readily accomplished.

In the past, numerous approaches in solving the problem of loading between a truck bed and a loading dock have been proposed. Some of the available dock loading ramp assemblies require affixing to the concrete face of the dock over a substantial area while others necessitate substantial modification of the concrete working surface of the loading dock near its loading edge.

In accordance with the present invention, a ramp assembly for a loading dock includes a pair of hinged ramp plates adapted to be selectively positioned at a plurality of angles and elevations to span a gap between the working surface of the dock and the bed of a truck for loading and unloading the truck. Along one longitudinal edge a first of the ramp plates is hinged to an angle member which is securable to the loading dock along an edge of the dock. A pair of bump blocks are secured independently to the vertical dock face spaced apart at opposite ends of the angle and the plates. Plate support members are secured to the inner faces of the bump blocks for supporting the plates when not in use and when at near horizontal positions when the plates span the gap between the face of the loading dock and the bed of a truck. A spring assembly is interconnected between the ramp plates and the angle and one inner face of one of the bump blocks for biasing the plates upwardly to facilitate lifting the plates when locating the plates or moving the plates to a working position between the dock and a truck bed.

It is a principal object of the invention to provide a new and improved loading ramp for mounting on a loading dock to provide a selectively adjustable working surface between the dock and the bed of a truck. It is another object of the invention to provide a loading dock ramp assembly which is useful in loading and unloading a truck from a dock when the truck is disposed at various elevations and angles relative to the dock working surface. It is another object of the invention to provide a dock ramp assembly which may be installed on a dock face without substantial structure securing the assembly to the face of the dock and without any substantial degree of modification of the dock working surface.

The foregoing objects and advantages of the invention will become more evident from a reading of the following detailed description of a preferred embodiment of the invention taken in conjunction with the accompanying drawings wherein.

Figure 5:
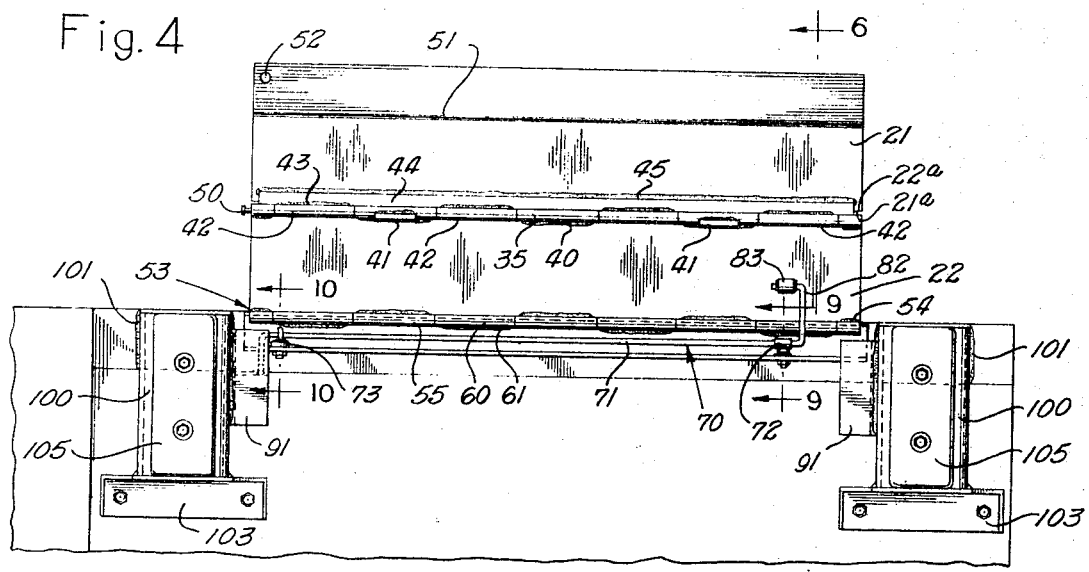
FIG. 5 is a back view in elevation showing the ramp assembly with the ramp plates in the vertical positions of FIG. 1.
Figures 6, 7, 8, 9, 10:
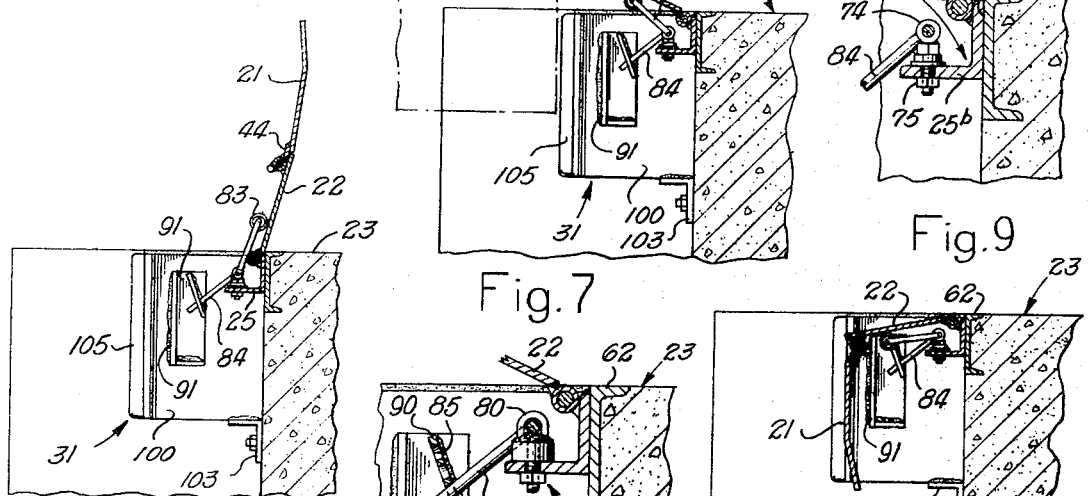
FIG. 6 is a fragmentary view in section along the line 6—6 of FIG. 5.
FIG. 7 is a fragmentary view in section of the dock and loading ramp assembly showing the ramp plates in somewhat elevated positions in engagement with a truck bed shown in phantom lines and having a working surface somewhat above the working surface of the dock.
FIG. 8 is a fragmentary view in section of the dock and loading ramp assembly showing the plates in the positions of rest as illustrated in FIG. 3.

FIG. 9 is a fragmentary enlarged view in section showing details of the spring assembly and the ramp plate securing and angle support means as seen along the line 9—9 of FIG. 5 with the ramp plates lowered to the positions of FIG. 7; and FIG. 10 is a fragmentary enlarged view in section along the line 10—10 of FIG. 5 with the plates at the angular positions of FIG. 9 and showing in increased detail the adjustable feature of the free end of the torsion spring employed in the spring assembly.

Figure 1:
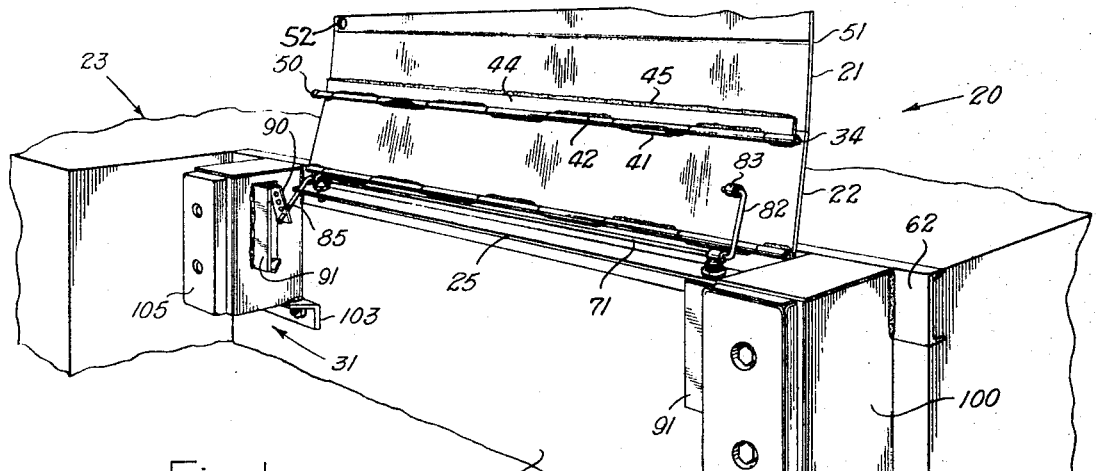
FIG. 1 is a fragmentary view in perspective of a loading ramp assembly secured with a loading dock, illustrating the ramp plates of the assembly lifted to a substantially vertical position preparatory to lowering the plates into contact with the bed of a truck, not shown.
Figure 2:
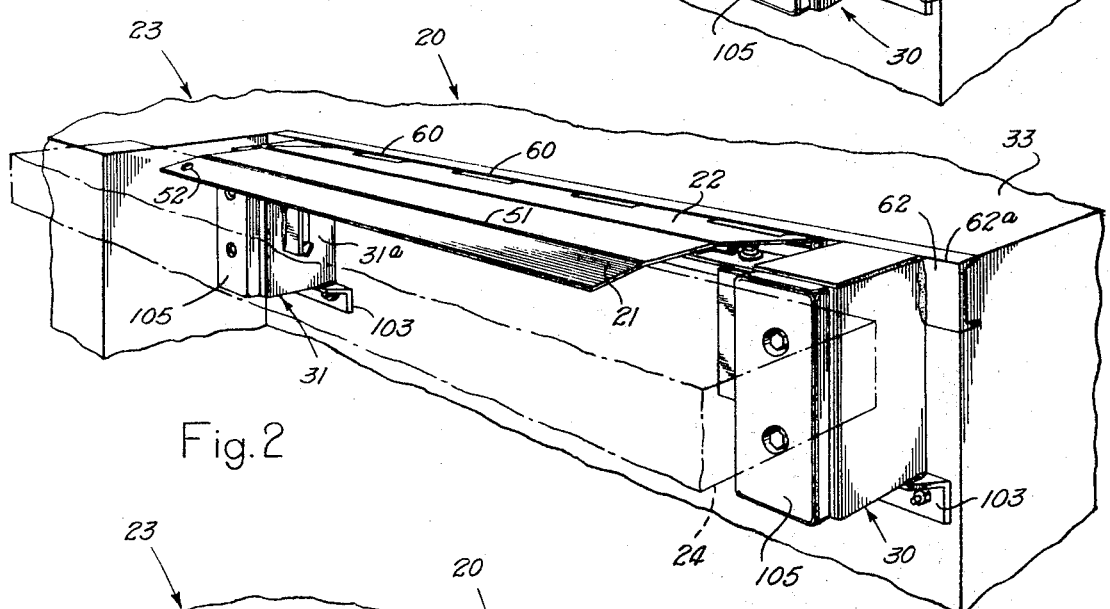
FIG. 2 is a perspective view similar to FIG. 1 showing in phantom lines a truck bed disposed adjacent to the ramp assembly with the ramp plates lowered into engagement with the top working surface of the truck bed.
Figure 3:
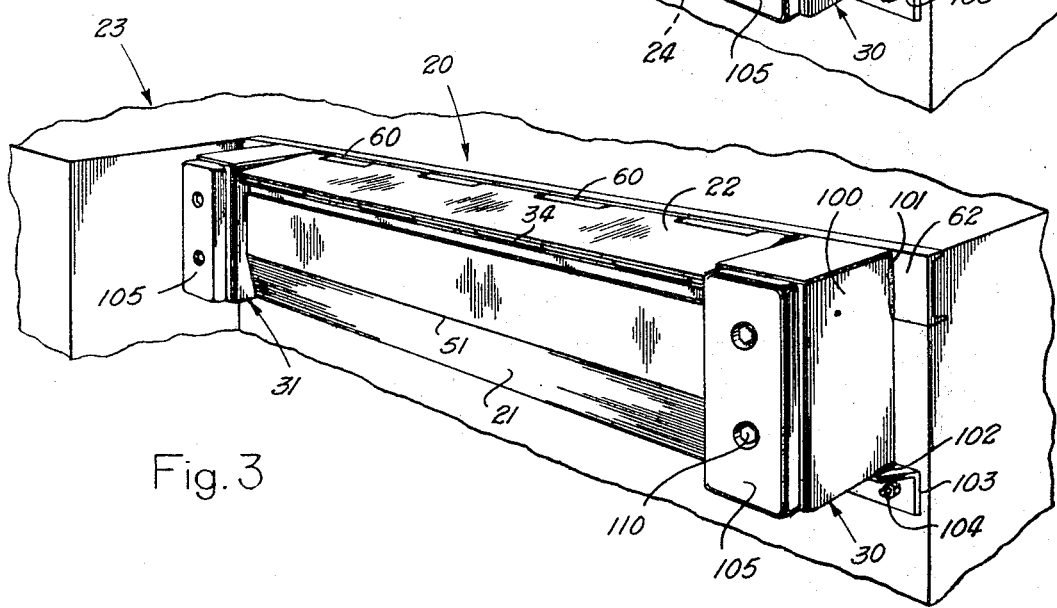
FIG. 3 is a view in perspective similar to FIGS. 1 and 2 illustrating the ramp plates folded downwardly to positions of rest as when the assembly is not in use.

Referring to the drawings, a loading dock ramp assembly 20 embodying the invention includes a pair of ramp plates 21 and 22 hinged together along longitudinal edges to provide a load bearing surface between a loading dock 23 and a truck bed 24 shown in phantom lines in FIG. 2. The ramp plates are secured along a longitudinal edge of the plate 22 to a mounting angle 25 which is connected along an upper longitudinal edge to the loading dock. A pair of identical bump blocks 30 and 31 are secured to the front face 32 of the dock at opposite ends of the plates. The hinged assembly of the plates 21 and 22 provides ready access for load-bearing equipment, such as trucks and dollies, between the dock working surface 33 and the truck bed 24 when the plates are in the positions shown in FIG. 2. FIG. 3 shows the plates folded downwardly when not in use. FIG. 1 shows the plates lifted vertically from the positions of FIG. 3 for lowering into engagement with the truck bed as in FIG. 2.

The assembly of the ramp plates 21 and 22 includes a piano-type hinge 34 secured with the bottom faces of the plates along adjacent longitudinal edges to permit the plates to fold between the substantially planar relationship of FIGS. 1 and 2 and the angular folded relationship of FIG. 3. Alternate sections 35 of the hinge are secured as by welding along lines 40 to the bottom face of the plate 22 near the edge 22a of the plate adjacent to the plate 21. On two of the hinged sections 35 small stop flange members 41 are welded to limit the extent to which the plate 21 may fold toward the plate 22. The other alternate sections 42 of the hinge are welded as at 43 to an edge of a longitudinal narrow connecting strip 44 which is welded to the plate 22 along a line 45 to position the hinge properly relative to the plates 21 and 22 which permits the plate edges 21a and 22a to fold together in an abutting relationship as generally represented in FIGS. 6 and 7. A hinge pin 50 is disposed through the tubular hinge members 40 and 42. The plate 21 is bent to a slight angle along a line 51 providing a bevel effect so that when the plate is in the working position of FIGS. 2 and 7, movement between the truck bed and the plate is facilitated and may be made more smoothly than if the plate were lying flat or possibly the edge of the plate engaging the truck bed were projecting upwardly to any extent. Also, the plate 21 has a hole 52 near one of the free end corners of the plate for engagement by a handling rod, not shown, to lift the plates 21 and 22 upwardly and lower them to the truck bed.

The assembly of the ramp plates 21 and 22 is secured to the dock 23 by a piano-type hinge assembly 53 which includes alternate end and internal or intermediate tubular hinge portions 54 and 55, respectively, which are welded to the bottom face of the plate 22 along the edge 22b of the plate disposed along the dock edge. The hinge assembly also includes alternate hinge portions 60 which are welded along lines 61 to the inside face of the mounting angle 25. The relationships and relative positions of the plate 22, the hinge assembly 53, and the mounting angle 25 are best seen in the enlarged views in section of FIGS. 9 and 10. The mounting angle 25 is secured to the dock 23 by welding the upper edge of the angle to the dock steel 62 along a weld line 63 at the upper vertical face of the dock steel. Unlike available conventional loading ramps, the mounting angle 25 is not secured by a plurality of bolts entering the front face 32 of the dock. The mounting angle 25 may, if desired, also be welded along the opposite end edges to the dock steel 62. If the dock is not provided with the steel channel 62, as illustrated in the drawings, some form of dock edge steel is generally installed in the dock to which the mounting angle 25 is then welded. The mounting of the plate assembly on the angle 25 and the securing of the angle 25 to the dock steel, as illustrated, aligns the plate edge 22b with the dock working surface 33 in close spaced relation with the upper dock corner edge 62a to provide smooth movement of loads between the dock surface and the top working surface of the plate 22 at various angular positions of the plate depending upon whether the truck bed 24 is above the dock working surface 33, as in FIG. 2, or is even with or below the dock surface.

The assembly of the working plates 21 and 22 is biased upwardly to reduce the manual force required in lifting the plates by a torsion spring assembly 70 interconnected between the plate 22, the mounting angle 25, and the inside face 31a of the bump block 31. The torsion spring assembly includes a torsion bar 71 supported along the length of the horizontal plate 25b mounting angle 25. The torsion bar is mounted on the angle 25 by a sleeve bearing assembly 72 and an eyelet-type bearing assembly 73 which are secured with the horizontal plate of the angle 25 in spaced apart relation along the length of the angle near the opposite ends of the torsion spring. The bearing assembly 72 includes a sleeve bearing 74 suitably secured on a bolt assembly 75 connected with the horizontal plate of the angle 25, as seen in FIGS. 5 and 9. Similarly, the bearing assembly 73 includes an eyelet or inverted U-shaped bearing 80 mounted on a bolt assembly 81 which also is secured to the horizontal plate of the mounting angle 25. At one end of the torsion bar 71 is bent to a U shape at 82 the end portion of which is provided with a roller 83 which engages the bottom face of the plate 22 applying the torsion force of the bar to the plate to bias the plate upwardly and thereby reduce the force necessary in lifting the plate. The other end of the torsion bar is bent along the bar end portion 84 in an opposite direction at an angle with the end 82. The bar end portion 84 is engaged with one of a plurality of holes 85 in a spring torsion adjusting bracket 90 secured along the inner face 31a of the bump block 31 at an angle to the vertical best seen in FIG. 10. The bracket 90 is welded to an inner face of a plate stop member 91 secured along the inner vertical side face of the bump block 31. As illustrated, the spring adjusting bracket 90 has four holes aligned in spaced relation along its length for adjusting the position of the torsion bar end portion 84 which controls the degree of torsion or spring effect in the bar between the bar and the plate 22. The torsion bar, including particularly the end portions of the bar, is formed to apply an upward force through the roller 83 to the bottom face of the plate 22, and, thus, the end portions 82 and 84 of the bar must tend to spread apart when the plates 21 and 22 are lifted from the rest positions of FIG. 8 to the vertical positions of FIGS. 1 and 5. Raising the torsion bar end portion 84 to one of the holes 85 upwardly along the bracket 90 tends to increase the amount of torsion or spring force applied by the bar to the plate 22. The adjustment of the position of the torsion bar end 84 in the bracket 90 is made by release of the bolt assembly 81 by unscrewing the nut on the bolt of the assembly, permitting the torsion bar end portion at the bracket to be lifted enough to relocate the end portion 84 in a selected one of the bracket holes 85. Raising the bar end portion, as seen in FIGS. 1 and 10, to one of the higher holes in the bracket forces the relative positions of the torsion bar end portions toward each other to increase the torsion force delivered by the bar to the plate 22.

The bump blocks 30 and 31 are identical structures, each including a rectangular hollow box-like member 100 preferably constructed of a plate material such as steel and generally, open along a back face at the dock vertical surface 32. The back edges of the vertical side faces of each of the bump block members 100 are secured to the face of the dock steel 62 by welding along a line 101 on each side of each of the members. The bottoms of each of the members 100 are each welded at each side along lines 102 to a horizontal plate of a support angle 103 secured by bolts 104 to the face 32 of the loading dock. As evident in FIG. 5, one support angle 103 is provided for each of the bump blocks and extends horizontally a somewhat greater width than the width of each of the bump blocks. The securing of the bump blocks only along upper portions of the members 100 and supporting the blocks on the angles 103 permits the mounting of the blocks along irregular dock faces as distinguished from the blocks having to fit closely over the entire back faces on a flat dock face surface. Since the back faces of the bump blocks are open the back edges of the vertical side faces 100 may be selectively shaped such as by torching out material to conform with irregularities, especially convex irregularities along the dock face to accommodate the bump blocks to such irregularities while permitting them to be vertically mounted. By mounting the bump blocks along only a portion of the upper part of the block to the front face of the channel 62 and supporting the bottom of each block on the angle 103 even convex irregularities along the dock face may be compensated for by securing the angles 103 into such a convex surface portion of the dock face if it is aligned with the lower part of a bump block. Under these circumstances, the bottom edges of the side panels 100 of the bump blocks are then mounted somewhat forward away from the dock face on the angles 103 to the extent that such is necessary to retain the vertical positioning of the bump blocks. A rubber rectangular bumper 105 is secured by vertically spaced bolts 110 to the back vertical face of each of the bump block members 100 to provide a cushion stop for the truck bed 24 when the truck is backed into engagement with the ramp assembly. The bump blocks are mounted on the dock face independently of the mounting arrangement for the assembly of plates 21 and 22 and are spced apart at opposite ends of the mounting angle 25.

Figure 4:
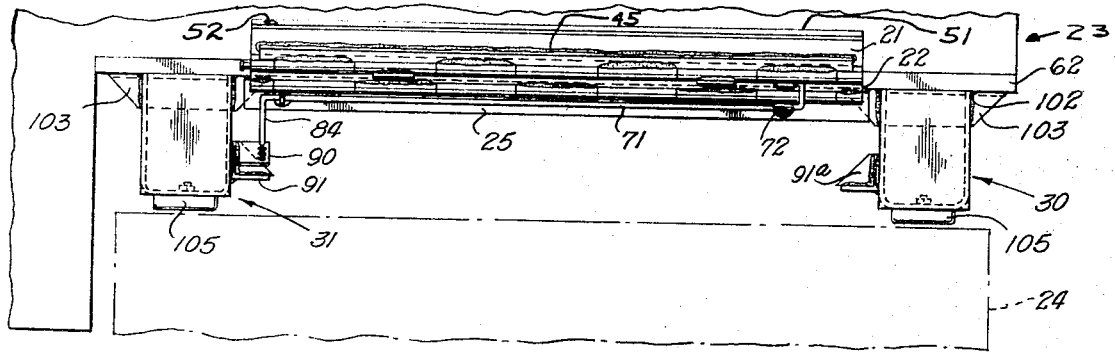
FIG. 4 is a top view in elevation showing the loading ramp assembly with the plates in position of FIG. 1 and a truck bed represented in phantom lines adjacent to the ramp assembly preparatory to lowering the plates to the positions of FIG. 2.

The plate stop 91 is mounted by welding along the inner side vertical face of the bump block 31 to provide a vertical stop or support on the bump block for the plate 22 when the plate is lowered to the position illustrated in FIG. 8. An identical plate stop 91 is also mounted at a corresponding height on the inside face of the other bump block 30, as seen in FIGS. 4 and 5. The two plate stops each comprises a vertically extending angle member with a triangular shaped bottom cross brace 91a welded into each of the angle members forming each stop. The plate stops 91 function to support the assembly of the plates 21 and 22 at the folded positions of rest illustrated in FIG. 8, and also when the bed of a truck is at a low enough elevation below the dock working surface 33 that the angle of inclination of the plates 21 and 22 to rest on the truck bed positions the plate 22 in a supporting relationship on the plate stops. As previously discussed, the torsion bar adjustment bracket 90 is secured on the inside face of the plate stop member 91 on the bump block 31.

The ramp assembly 20 is useful for loading and unloading trucks having a bed which may be above, below, or at an elevation equal to the working surface 33 of the loading dock 23. When the ramp assembly is not in use, the plates 21 and 22 are folded to the positions shown in FIGS. 3 and 8. In this position of the plate assembly the plate 22 rests on the upper ends of the plate stops 91 bending the torsion bar 71 to the shape seen in FIG. 8 at which the roller 83 is pressed downwardly bending the rod end portion 82 toward the other rod end portion 84 so that the maximum force of the torsion bar will be available for lifting the plate assembly. The plate 21 in this rest position is pivoted on the hinge assembly 40 to a substantially vertical hanging position slightly greater than 90° with the plate 22, as evident in FIG. 8. At this position of the plate 21 it will be particularly evident from FIGS. 3 and 8 that the plate is tucked inwardly toward the dock face 32 from the bumpers 105. Similarly, the exposed edge 22a of the plate 22 at the hinge between the plates is aligned inwardly toward the dock face from the bumper vertical surfaces. This plate assembly positioning is particularly important as it permits a truck bed to be backed against the bumpers on the bump block without any need to move the plates from the folded position of FIG. 8. When the truck is positioned with its bed engaged with the bumpers 105, as in FIGS. 2 and 7, a suitable lifting rod, not shown, is inserted into the hole 52 in the plate, and the assembly of plates 21 and 22 is lifted upwardly to the upright position of FIGS. 1, 5, and 6. The force of the torsion bar 70 acting through the roller 83 on the bottom face of the plate 22 assists in raising the plates by urging the plate 22 upwardly pivoting it about the hinge 53 so that an operator may readily manually manipulate the plates, which are of substantial weight, without excessive strain or force. The plates are then lowered until the plate 22 comes to rest on the truck bed surface as in FIGS. 2 and 7. Loads are then readily moved between the truck bed and the dock surface 33 over the top surfaces of the plates 21 and 22.

When the handling of loads between truck bed 24 and the dock surface is completed across the ramp assembly, the simplest and preferred manner of returning the ramp assembly plates 21 and 22 to the folded positions of FIGS. 3 and 8 is to move the truck away from the bump blocks 30 and 31. When the truck bed is moved from the bumpers 105 to a position at which the plate 21 no longer can reach the truck bed, the plates automatically fold downwardly due to the force of gravity. The plate 22 pivots downwardly on the hinge 53 until the bottom face of the plate comes to rest on the upper end edges of the plate stops 91 on the inside faces of the bump blocks. Simultaneously, the plate 21 folds downwardly about the hinge 34 to the substantially vertical position of FIG. 8. The plate assembly then remains in the folded condition of FIGS. 3 and 8 until the ramp assembly is again needed for moving loads between a truck bed and the loading dock.

If, for some reason, it is desired to remove the loading ramp assembly plates from the truck bed prior to moving the truck away from the dock, there is sufficient space between the plane of the front faces of the bump blocks and the front of the dock face to permit the folding of the plates with the truck bed in position against the bump blocks. Such a situation might arise where there are back doors on the truck which the operator wishes to close before moving the truck away from the dock. In this event, the plate assembly is lifted upwardly toward the position of FIGS. 1 and 5, and the plate 21 is folded toward the truck bed on the hinge 34 to a position substantially perpendicular to the plate 22 at which position the plate 21 may be inserted downwardly along the back edge of the truck bed into the space between the bump blocks and the truck bed and the plate stops 91. It will be evident from FIG. 7 that ample space exists for such folding of the plates. When plate 21 is inserted into the space behind the truck bed, the plates may then be allowed to drop downwardly and with the opposing force of the spring assembly will

What is claimed is:

1. A selectively movable ramp assembly for a loading dock comprising: mounting means adapted to be supported at a dock face; ramp plate means pivotally secured to said mounting means and movable to a plurality of positions for engaging a truck bed to provide a load bearing surface between said dock and said truck bed; two spaced open-backed bump blocks adapted to be disposed at opposite ends and independently of said mounting means and secured with said dock along upper and lower portions only of each of said blocks to provide cushioned engagement with a truck bed for positioning said truck bed relative to said ramp plate means; a torsion spring operatively associated with said ramp plate means and said mounting means and with at least one of said bump blocks for biasing said ramp plate means upwardly on said mounting means for minimizing the force required to manipulate said plate means; and ramp plate stop means on each of said bump blocks for positioning and supporting said ramp plate means at a predetermined angle.

2. A ramp assembly in accordance with claim 1 wherein one end of said torsion spring means is selectively connectible with and adjustable relative to one of said bump blocks for varying the torsion spring force applied to said ramp plate means.

3. A ramp assembly in accordance with claim 2 wherein said ramp plate means comprises a first plate hinged along one longitudinal edge with said mounting means and a second plate hinged along one longitudinal edge with the other longitudinal edge of said first plate.

4. A ramp assembly in accordance with claim 3 wherein said plates are selectively movable between a folded position of rest and a plurality of working positions for engagement with a truck bed at selected elevations above, equal to, and below said loading dock.

5. A loading ramp assembly in accordance with claim 4 wherein said first and second plates are movable between positions of rest and said plurality of working positions with said truck bed when said truck bed is at a loading and unloading location engaged with said bump blocks.

6. A loading ramp assembly in accordance with claim 5 wherein said mounting means is secured along the top edge thereof with a top edge of a strip of curb steel along a top edge of said loading dock toward the loading position for said truck bed.

7. A loading ramp assembly in accordance with claim 6 wherein said mounting means comprises an angle member having a vertical plate secured with said dock curb steel and a horizontal plate supporting a portion of said spring means.

8. A loading ramp assembly for use with a loading dock for loading a truck bed at said dock at a plurality of vertical positions relative to said dock comprising: an angle mounting member having vertical and horizontal plate portions, said vertical plate portion being secured by welding along an upper longitudinal horizontal edge thereof with a curb member of said dock at an upper horizontal corner edge of said dock; a first ramp plate of rectangular elongated shape pivotally secured by hinge means with said angle member at said upper edge of said vertical plate of said angle member; a second ramp plate of rectangular elongated shape secured along one longitudinal edge by hinge means to the other longitudinal edge of said first ramp plate, said plates being movable relative to each other between substantially planar relationship and substantially perpendicular relationship, said first ramp plate being movable from a substantially vertical position to a downwardly sloping position relative to the working surface of said dock, the longitudinal edges of said first and second plates along said hinge means connecting said first plate with said second plate being adapted to engage each other in abutting relationship to hold said plates in a substantially planar relationship when said second plate is engaged on said truck bed; a pair of open backed bump blocks secured along a vertical face of said dock at opposite ends independently of said angle member, each of said bump blocks being secured along an upper portion thereof with said curb strip of said dock and secured with said dock vertical face along a lower portion thereof, and each of said bump blocks having a cushion member along a vertical face substantially parallel with said vertical face of said dock for engagement by said truck bed when said truck is loading and unloading at said dock; a plate stop member on the inner face of each of said bump blocks for supporting said first plate at a near horizontal position; a torsion bar supported along said horizontal plate portion of said mounting angle and having a first end substantially perpendicular to the major portion of the length of said bar provided with a roller engageable with a face of said first ramp plate for biasing said ramp plate upwardly about said hinge means connecting said first ramp plate with said angle member, and said torsion bar having a second end portion bent substantially perpendicular to said major portion of the length of said bar; a torsion bar adjusting bracket secured with an inner face of one of said bump blocks adjacent said second end portion of said torsion bar and engageable by said second end portion of said torsion bar at a plurality of positions for adjusting the torsion force in said bar for varying the force applied by said bar to said first ramp plate; and said ramp plates being movable between working positions with said truck bed and folded rest position supported on said stop members on said bump blocks while said truck bed is engaged with said cushion members of said bump blocks whereby said ramp plates may be removed from said positions of rest, engaged with said truck bed, and returned to said positions of rest without moving said truck bed from said bump blocks.

9. A loading ramp assembly in accordance with claim 8 wherein each of said bump blocks is secured to and supported on a horizontal angle member secured into the front face of said loading dock, said angle member having a horizontal plate portion extending across the bottom face of said bump block.

* * * * *